(12) United States Patent
Hu

(10) Patent No.: US 12,187,371 B2
(45) Date of Patent: Jan. 7, 2025

(54) SEAT SHOCK ABSORBING DEVICE

(71) Applicant: Rongmei Hu, Hubei Province (CN)

(72) Inventor: Rongmei Hu, Hubei Province (CN)

( * ) Notice: Subject to any disclaimer, the term of this patent is extended or adjusted under 35 U.S.C. 154(b) by 78 days.

(21) Appl. No.: 17/951,471

(22) Filed: Sep. 23, 2022

(65) Prior Publication Data

US 2024/0101206 A1 Mar. 28, 2024

(51) Int. Cl.
*B62J 1/06* (2006.01)

(52) U.S. Cl.
CPC ...................... *B62J 1/06* (2013.01)

(58) Field of Classification Search
CPC .......................................................... B62J 1/06
See application file for complete search history.

(56) References Cited

U.S. PATENT DOCUMENTS

| | | | | |
|---|---|---|---|---|
| 1,229,353 A * | 6/1917 | Walker | ........................ | B62J 1/02 297/211 |
| 1,474,977 A * | 11/1923 | Mesinger | .................... | B62J 1/02 267/132 |
| 2,115,177 A * | 4/1938 | Pryale | ........................ | B62J 1/02 297/212 |
| 2,225,316 A * | 12/1940 | Mesinger | .................... | B62J 1/26 297/212 |
| 4,531,761 A * | 7/1985 | von Sivers | ........... | B60G 99/004 267/293 |
| 4,772,054 A * | 9/1988 | Schreiber | ................ | E05C 17/28 292/252 |
| 5,507,476 A * | 4/1996 | Lin | ............................ | B62J 1/02 297/211 |
| 6,260,918 B1 * | 7/2001 | Lee | ............................ | B62J 1/02 297/211 |
| 6,773,061 B1 * | 8/2004 | Shu | ............................ | B62J 1/02 297/211 |
| 7,441,420 B2 * | 10/2008 | Kim | ....................... | D06F 39/001 68/3 R |
| 9,764,788 B1 * | 9/2017 | Sung | ........................ | F16F 3/10 |
| 9,957,007 B2 * | 5/2018 | Bigolin | ..................... | B62J 1/02 |

* cited by examiner

*Primary Examiner* — Philip F Gabler

(57) ABSTRACT

A seat shock absorbing device provided by the present disclosure includes a seat cushion, a bracket fixed below the seat cushion, and an elastic component fixed on the bracket; the bracket is provided with a bent mounting part; the elastic component includes an annular gasket fixed on the inner side of the mounting part and a spring fixed on the inner side of the gasket; and the spring supports the seat cushion from the bottom. The bracket is separated from the elastic component using the gasket, so that collision caused by direct contact between the spring and the bracket can be effectively avoided.

10 Claims, 4 Drawing Sheets

SEAT SHOCK ABSORBING DEVICE

TECHNICAL FIELD

The present disclosure relates to the technical field of sports goods, in particular, to a seat shock absorbing device.

BACKGROUND

Cycling is a popular way of traveling and fitness nowadays. In order to reduce the shock and impact conducted by a frame from the ground and improve the user experience, seats of many bicycles, electric vehicles or exercise bikes have a shock attenuation function.

A common shock absorbing seat is composed of a seat cushion, a bracket that supports the seat cushion from the bottom of the seat cushion, and a spring welded to the bracket to provide a vertical resistance. However, during use, the spring and the bracket often collide with each other to generate noise, so that the user experience is poor. Furthermore, there is a risk that the spring falls off since the spring and the bracket often collide with each other.

SUMMARY

Based on this, it is necessary to provide a seat shock absorbing device, so as to avoid the spring from being in direct contact with the bracket.

The present disclosure provides a seat shock absorbing device, including a seat cushion, a bracket fixed below the seat cushion, and an elastic component fixed on the bracket; the bracket is provided with a bent mounting part; the elastic component includes an annular gasket fixed on the inner side of the mounting part and a spring fixed on the inner side of the gasket; and the spring supports the seat cushion from the bottom.

Preferably, the gasket includes an upper part, a waist part, and a lower part which are vertically arranged; an outer diameter of the waist part is less than the outer diameters of the upper part and the lower part; and the waist part is clamped to the mounting part.

Preferably, the spring includes a spring upper part, a spring middle part, and a spring lower part which are vertically arranged; and the spring middle part is clamped to the inner side of the gasket.

Preferably, the diameter of an end of the spring upper part close to the spring middle part is greater than the diameter of an end of the spring upper part away from the spring middle part; and the diameter of an end of the spring lower part close to the spring middle part is greater than the diameter of an end of the spring lower part away from the spring middle part.

Preferably, the elastic component further includes a screw rod running through the spring; and the screw rod is fixed on a bottom surface of the seat cushion.

Preferably, a mounting slot is formed in the bottom surface of the seat cushion; the bracket further comprises a fixed part away from the mounting part; and the fixed part is plugged in the mounting slot.

Preferably, a distance between the fixed part and the seat cushion is shorter than a distance between the mounting part and the seat cushion.

Preferably, the bracket and the spring are made of metal, and the gasket is made of plastic.

Preferably, the seat cushion is made of plastic.

A seat shock absorbing device provided by the present disclosure includes a seat cushion, a bracket fixed below the seat cushion, and an elastic component fixed on the bracket; the bracket is provided with a bent mounting part; the elastic component includes an annular gasket fixed on the inner side of the mounting part and a spring fixed on the inner side of the gasket; and the spring supports the seat cushion from the bottom. The bracket is separated from the elastic component using the gasket, so that collision caused by direct contact between the spring and the bracket can be effectively avoided, thus reducing the noise, and improving the comfort level. Furthermore, the seat shock absorbing device has a firm structure, and will not fall off.

BRIEF DESCRIPTION OF THE DRAWINGS

To describe the specific implementation modes of the present disclosure or the technical solutions in the prior art more clearly, drawings required to be used in the specific implementation modes or the illustration of the prior art will be briefly introduced below. Apparently, the drawings in the illustration below are some implementation modes of the present disclosure. Those ordinarily skilled in the art can also obtain other drawings according to these drawings without doing creative work.

DETAILED DESCRIPTION OF THE EMBODIMENTS

Figure 1:
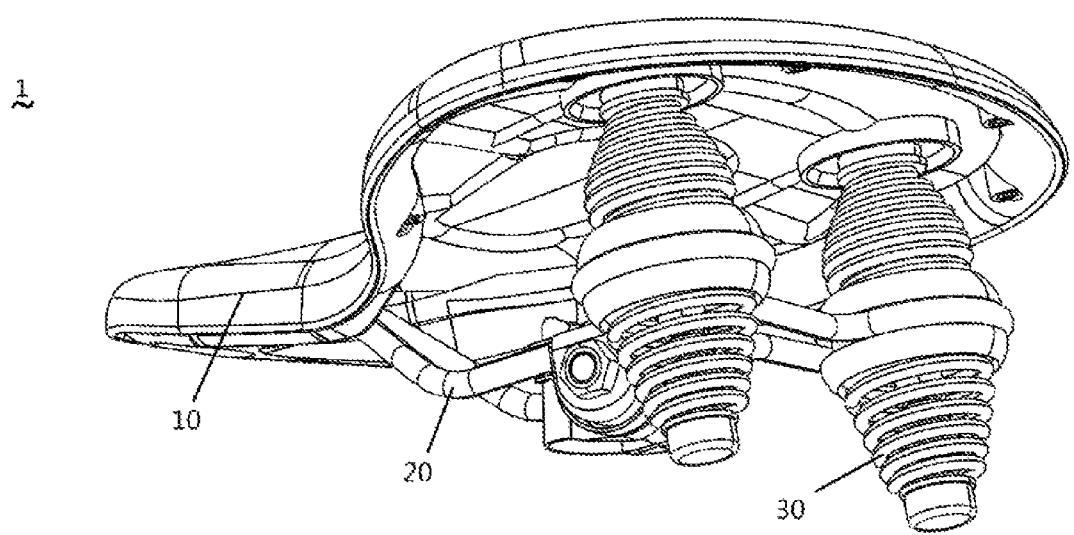
FIG. 1 is a schematic assembled diagram of a seat shock absorbing device provided according to one embodiment.

The technical solutions of the present disclosure will be clearly and completely described below in conjunction with the accompanying drawings. Apparently, the described embodiments are only a part of the embodiments of the present disclosure, rather than all the embodiments. All other embodiments obtained by those of ordinary skill in the art based on the embodiments in the present disclosure without creative work shall fall within the protection scope of the present disclosure.

In the description of the present disclosure, it should be noted that orientations or positional relationships indicated by the terms "center", "upper", "lower", "left", "right", "vertical", "horizontal", "inside", "outside", and the like are orientations or positional relationships as shown in the drawings, and are only for the purpose of facilitating and simplifying the description of the present disclosure instead of indicating or implying that devices or elements indicated must have particular orientations, and be constructed and operated in the particular orientations, so that these terms are not construed as limiting the present disclosure. In addition, the terms "first", "second" and "third" are only for the purpose of description, and may not be understood as indicating or implying the relative importance.

Figure 2:
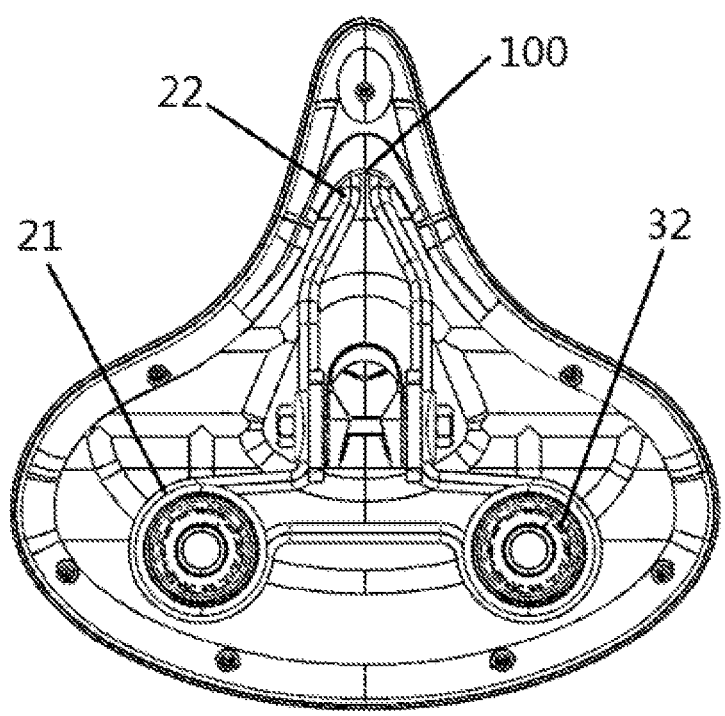
FIG. 2 is a bottom view of a seat shock absorbing device provided according to one embodiment.
Figure 3:
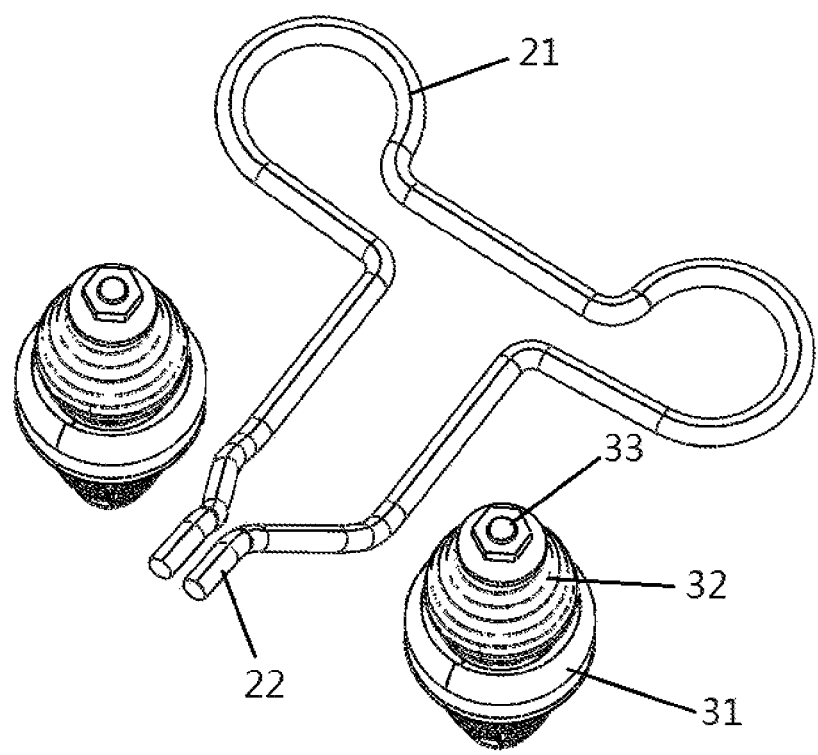
FIG. 3 is a schematic exploded diagram of a bracket and an elastic component of a seat shock absorbing device provided according to one embodiment.
Figure 4:
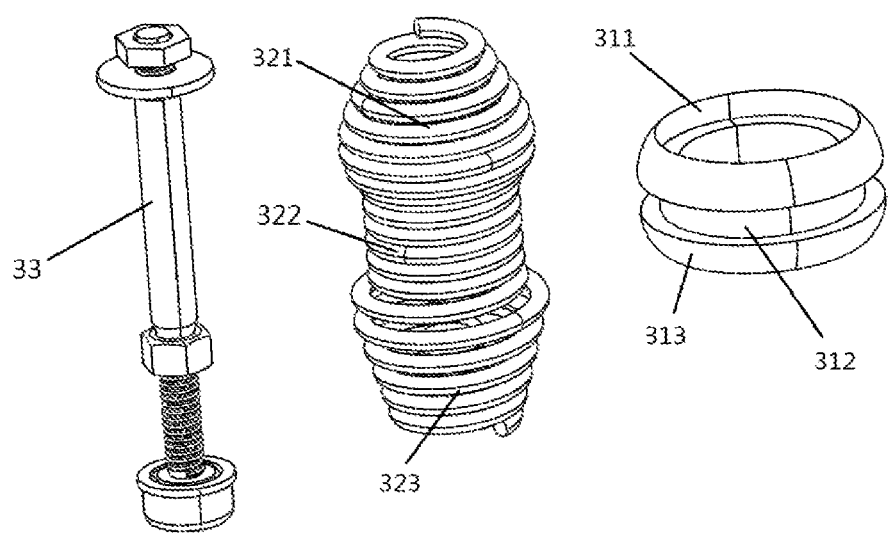
FIG. 4 is a schematic exploded diagram of an elastic component of a seat shock absorbing device provided according to one embodiment.

As shown in FIG. 1 to FIG. 4, the present disclosure provides a seat shock absorbing device 1, including seat cushion 10, a bracket 20 fixed below the seat cushion 10, and an elastic component 30 fixed on the bracket 20. The bracket 20 includes a bent mounting part 21, and a fixed part 22 away from the mounting part 21; the elastic component 30 includes an annular gasket 31 fixed on the inner side of the mounting part 21 and a spring 32 fixed on the inner side of the gasket 31; and the spring 32 supports the seat cushion 10 from the bottom.

Specifically, the gasket 31 includes an upper part 311, a waist part 312, and a lower part 313 which are vertically arranged; an outer diameter of the waist part 312 is less than the outer diameters of the upper part 311 and the lower part 313, so that the waist part 312 is clamped to the mounting part 21, and the upper part 311 and the lower part 313 clamp the mounting part 21.

The spring 32 includes a spring upper part 321, a spring middle part 322, and a spring lower part 323 which are vertically arranged; and the diameter of an end of the spring upper part 321 close to the spring middle part 322 and the diameter of an end of the spring lower part 323 close to the spring middle part 322 are both greater than the diameter of the spring middle part 321. In this way, the spring middle part 322 is clamped to the inner side of the gasket 31; the spring upper part 321 and the spring lower part 323 clamp the gasket 31; and the spring 32 and the bracket 20 are completely separated by the gasket 31.

In this embodiment, the diameter of the end of the spring upper part 321 close to the spring middle part 322 is greater than the diameter of an end of the spring upper part 321 away from the spring middle part 322; and the diameter of the end of the spring lower part 323 close to the spring middle part 322 is greater than the diameter of an end of the spring lower part 323 away from the spring middle part 322, which achieves a relatively good shock absorbing effect.

The elastic component 30 further includes a screw rod 33 running through the spring 32; and the screw rod 33 is fixed on a bottom surface of the seat cushion 10. A mounting slot 100 is formed in the bottom surface of the seat cushion 10; and the fixed part 22 of the bracket 20 is plugged in the mounting slot 100. A distance between the fixed part 22 and the seat cushion 10 is shorter than a distance between the mounting part 21 and the seat cushion 10, so that a better comfort level is provided while ensuring the shock absorbing effect.

In this embodiment, the bracket 20 and the spring 32 are made of metal, and the gasket 31 and the seat cushion 10 are made of plastic, so that the adaptation is good, and the parts are combined precisely.

A seat shock absorbing device provided by the present disclosure includes a seat cushion, a bracket fixed below the seat cushion, and an elastic component fixed on the bracket; the bracket is provided with a bent mounting part; the elastic component includes an annular gasket fixed on the inner side of the mounting part and a spring fixed on the inner side of the gasket; and the spring supports the seat cushion from the bottom. The bracket is separated from the elastic component using the gasket, so that collision caused by direct contact between the spring and the bracket can be effectively avoided, thus reducing the noise, and improving the comfort level. Furthermore, the seat shock absorbing device has a firm structure, and will not fall off.

The above various embodiments are only used to describe the technical solutions of the present disclosure, and not intended to limit the present disclosure. Although the present disclosure has been described in detail with reference to the foregoing embodiments, those ordinarily skilled in the art should understand that they can still modify the technical solutions described in all the foregoing embodiments, or equivalently replace some or all of the technical features, and these modifications or replacements do not depart the essences of the corresponding technical solutions from the spirit and scope of the technical solutions of all the embodiments of the present disclosure.

What is claimed is:

1. A seat shock absorbing device, comprising
a seat cushion,
a bracket fixed below the seat cushion, and
an elastic component fixed on the bracket, wherein
the bracket is provided with a bent mounting part; the elastic component comprises an annular gasket passing through the bent mounting part and a coil spring passing through the annular gasket; and the spring supports a bottom of the seat cushion
wherein the annular gasket comprises an upper part, a waist part, and a lower part which are vertically arranged and symmetrical, wherein an outer diameter of the waist part is less than outer diameters of the upper part and the lower part, and wherein the junctions of the waist part and the upper and lower parts form right angles; and
wherein the waist part is clamped to the bent mounting part, wherein the gasket is configured to securely connect the spring and prevent direct contact between the spring and the bracket.

2. The seat shock absorbing device according to claim 1, wherein the spring comprises a spring upper part, a spring middle part, and a spring lower part which are vertically arranged; and the spring middle part is clamped to the inner side of the annular gasket.

3. The seat shock absorbing device according to claim 2, wherein a diameter of an end of the spring upper part adjacent to the spring middle part is greater than a diameter of an end of the spring upper part away from the spring middle part; and a diameter of an end of the spring lower part adjacent to the spring middle part is greater than a diameter of an end of the spring lower part away from the spring middle part.

4. The seat shock absorbing device according to claim 1, wherein the upper part and the lower part clamp the bent mounting part.

5. The seat shock absorbing device according to claim 2, wherein the spring upper part and the spring lower part clamp the annular gasket.

6. The seat shock absorbing device according to claim 3, wherein the elastic component further comprises a screw rod running through the spring, and the screw rod is fixed on a bottom surface of the seat cushion.

7. The seat shock absorbing device according to claim 6, wherein a mounting slot is formed in the bottom surface of the seat cushion; the bracket further comprises a fixed part away from the bent mounting part; and the fixed part is plugged in the mounting slot.

8. The seat shock absorbing device according to claim 7, wherein a distance between the fixed part and the seat cushion is shorter than a distance between the bent mounting part and the seat cushion.

9. The seat shock absorbing device according to claim 8, wherein the bracket and the spring are made of metal, and the annular gasket is made of plastic.

10. The seat shock absorbing device according to claim 8, wherein the seat cushion is made of plastic.

* * * * *